Patented Oct. 17, 1922.

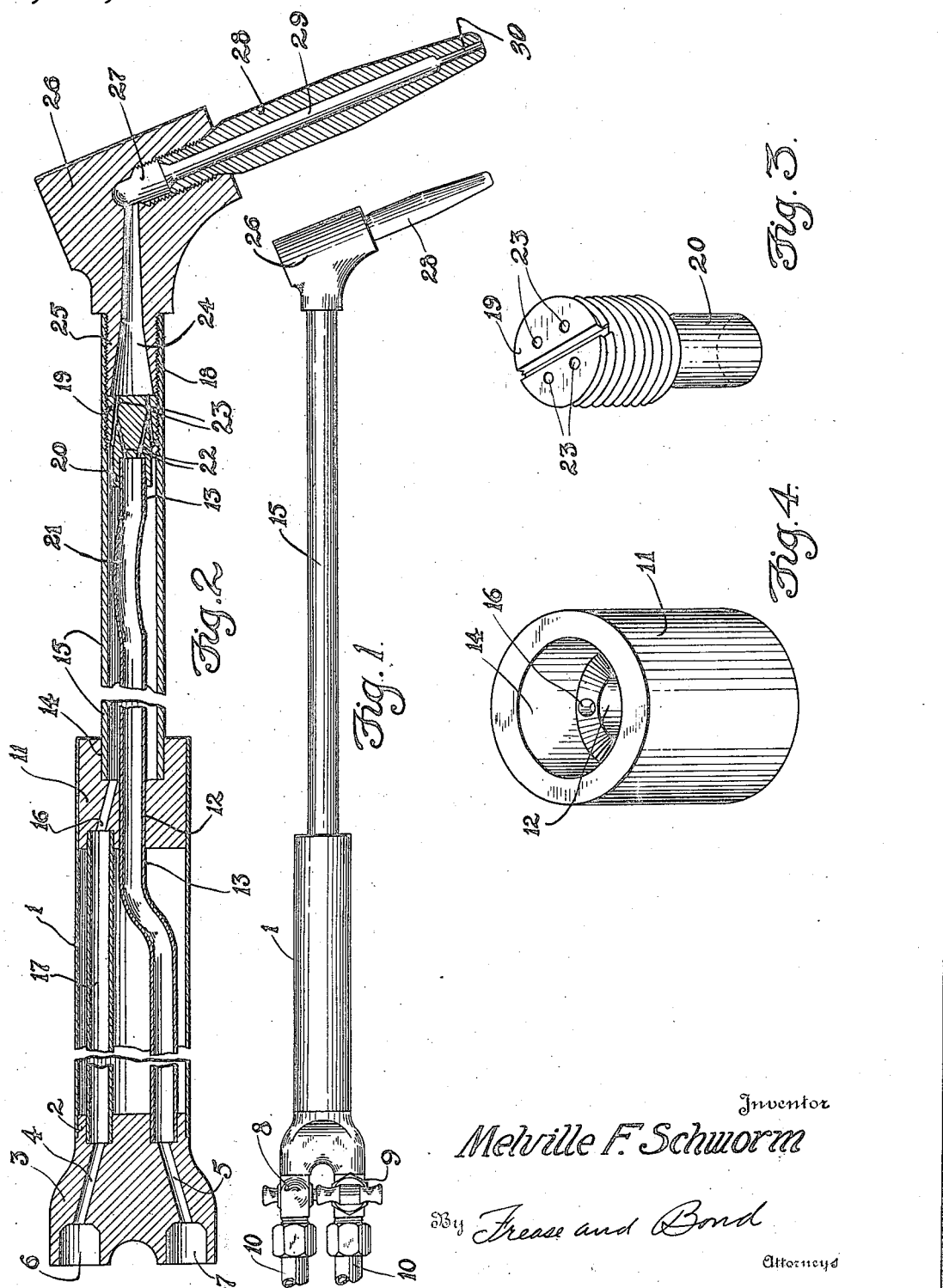

1,432,418

UNITED STATES PATENT OFFICE.

MELVILLE F. SCHWORM, OF MASSILLON, OHIO.

OXYACETYLENE WELDING TORCH.

Application filed June 28, 1921. Serial No. 481,004.

*To all whom it may concern:*

Be it known that I, MELVILLE F. SCHWORM, a citizen of the United States, residing at Massillon, in the county of Stark and State of Ohio, have invented a new and useful Oxyacetylene Welding Torch, of which the following is a specification.

This invention relates to oxy-acetylene welding torches and has for its objects to provide a torch of this character in which the mixing of the oxygen and acetylene takes place just prior to the delivery of the gases to the tip of the torch, means being provided for preheating the oxygen prior to the mixing of the gases, thus supplying the mixture with hot oxygen which increases the temperature of the flame, means also being provided for preventing the acetylene from becoming overheated and decomposing prior to the mixture of the gases.

The above and other objects may be attained by lowering the acetylene supply tube within the oxygen tube in order to lower the temperature of the acetylene to prevent decomposing thereof and to preheat the oxygen; a multiple mixer being provided adjacent to the head which carries the tip of the torch, the acetylene and oxygen being mixed therein in streams which are projected at angles into the mixing chamber in which the streams of mixed gases are further mixed together.

With these objects in view, the invention consists in the construction and arrangement of parts, hereinafter described and illustrated in the accompanying drawings, it being understood that various changes in the form and details of construction may be made within the scope of the appended claims.

The preferred embodiment of the invention thus set forth in general terms is illustrated in the accompanying drawings, in which—

Figure 1 is a side elevation of a welding torch embodying the invention;

Fig. 2, a longitudinal, sectional view of the same upon an enlarged scale;

Fig. 3, a detail perspective view of the multiple mixer; and

Fig. 4, a perspective view of the block in the handle through which the oxygen and acetylene tubes are located.

Similar numerals of reference indicate corresponding parts throughout the drawings:

The handle of the torch comprises the open end cylinder 1, into one end of which is inserted the reduced annular portion 2 of the valve block 3, having the spaced passages 4 and 5 therethrough, which connect at their outer ends with the enlarged sockets 6 and 7 respectively, and which receive the oxygen and acetylene valves 8 and 9 respectively, the usual flexible tubes 10 being connected to said valves and communicating with suitable sources of supply of the respective gases.

The cylinder block 11 is located in the other extremity of the handle 1 and provided with the central bore 12, through which the acetylene tube 13 is passed, the rear extremity of said tube being inserted into the enlarged inner end of the passage 5.

An enlarged counter bore 14 is provided in the outer end of the block 11 and receives the extremity of the enlarged oxygen tube 15, the inclined passage 16 through the block providing communication between said tube and the oxygen tube 17, which is located through the handle and communicates with the passage 4 in the valve block.

The oxygen tube 15 is provided at its other extremity with internal threads as shown at 18, the multiple mixer 19 being located therein and spaced from the end of the tube. This multiple mixer is provided with the reduced nipple 20 into which is inserted the adjacent extremity of the acetylene tube 13, said tube being preferably provided with the bend 21 to allow for expansion and contraction of the same.

The multiple mixer is provided with a plurality of inclined passages 22, connected at one end with the acetylene tube 21, and at the other end with the oppositely inclined passages 23, intermediate the extremities thereof, said passages 23 communicating with the oxygen tube 15 and with the tapered mixing chamber 24 formed in the threaded nipple 25 of the head 26, said nipple being extended into the internally threaded extremity of the tube 15.

The reduced extremity of the mixing chamber 24 connects with an expansion chamber 27 provided in the head, any usual form of tip 28 being carried by the head and provided with the usual longitudinal passage 29, restricted at the outer end as at 30.

With this construction, it will be seen that the acetylene tube 21, being surrounded by oxygen passing through the oxygen tube 15, is thus insulated from the heat, preventing the acetylene from becoming overheated and decomposing, while at the same time the oxygen is preheated as it passes through the tube 15, before entering the mixer, thus reducing the liability of filling the flame with cold oxygen, the heated oxygen producing a much hotter flame.

By preheating the oxygen before passing it into the mixing chamber, less oxygen is required for the flame, and the possibility of oxidizing the metal is reduced to a minimum. With this construction, a very soft and well proportioned flame is produced which is easy to handle and which produces soft and ductile welds.

The multiple mixer being provided with the oxygen and acetylene passages, slightly inclined toward each other, terminating in a single passage, creates what might be termed, a double suction or vacuum. When one or the other of the gases for any reason increases or decreases in pressure, these fluctuations or variations in pressure being frequent in all types of regulating and controlling devices in common use, the gas with the greatest velocity will siphon the other gas, tending to maintain a uniform flame and eliminating the frequent changing of the flame from carbonizing to oxiding or vice versa.

I claim:—

1. A torch of the character described, including an oxygen tube, an acetylene tube of smaller diameter than the oxygen tube and located therein, a multiple mixer located within the oxygen tube and provided with a reduced nipple spaced from the inner walls of the oxygen tube, the extremity of the acetylene tube extending into said nipple, said multiple mixer being provided with a plurality of passages communicating with the oxygen tube and a plurality of passages communicating with the acetylene tube and with the first named passages.

2. A torch of the character described, including an oxygen tube, an acetylene tube of smaller diameter than the oxygen tube and located therein, a multiple mixer in the oxygen tube and provided with a reduced nipple spaced from the inner walls of the oxygen tube, the extremity of the acetylene tube extending into said nipple, said multiple mixer being provided with a plurality of converging passages surrounding the nipple and communicating with the oxygen tube and a plurality of passages communicating with the acetylene tube and with the first named passages.

3. A torch of the character described, including an oxygen tube, an acetylene tube of smaller diameter than the oxygen tube and located therein, a multiple mixer located within the oxygen tube and provided with a reduced nipple spaced from the inner walls of the oxygen tube, the extremity of the acetylene tube extending into said nipple, said multiple mixer being provided with a plurality of passages communicating with the oxygen tube and a plurality of passages communicating with the acetylene tube and with the first named passages, a head connected to the multiple mixer, and a tip connected to the head, the head being provided with a mixing chamber terminating in a restricted throat and the tip having an expansion chamber throughout its length communicating with the restricted throat and terminating at the point of the tip in a single restricted passage.

In testimony that I claim the above, I have hereunto subscribed my name.

MELVILLE F. SCHWORM.